(12) United States Patent
Jeuch

(10) Patent No.: US 6,895,779 B2
(45) Date of Patent: May 24, 2005

(54) ADSORPTION REFRIGERATING DEVICE

(75) Inventor: Pierre Jeuch, Saint-Aubin (FR)

(73) Assignee: Thermagen, Gif-sur Yvette (FR)

( * ) Notice: Subject to any disclaimer, the term of this patent is extended or adjusted under 35 U.S.C. 154(b) by 0 days.

(21) Appl. No.: 10/416,446

(22) PCT Filed: Nov. 9, 2001

(86) PCT No.: PCT/FR01/03479

§ 371 (c)(1),
(2), (4) Date: Sep. 9, 2003

(87) PCT Pub. No.: WO02/39035

PCT Pub. Date: May 16, 2002

(65) Prior Publication Data

US 2004/0035145 A1 Feb. 26, 2004

(30) Foreign Application Priority Data

Nov. 13, 2000 (FR) .............................. 00 14559

(51) Int. Cl.$^7$ ................................ F25B 17/08
(52) U.S. Cl. ............................ 62/480; 62/101; 62/478; 165/104.12
(58) Field of Search ...................... 62/101, 106, 109, 62/478, 480; 165/10, 104.12

(56) References Cited

U.S. PATENT DOCUMENTS

| 4,367,079 A | 1/1983 | Wallsten |
| 4,581,049 A | 4/1986 | Januschkowetz |
| 4,610,148 A | * 9/1986 | Shelton .................... 62/480 |
| 4,637,218 A | 1/1987 | Tchernev |
| 4,674,563 A | 6/1987 | Maier-Laxhuber et al. |
| 4,759,191 A | 7/1988 | Thomas et al. |
| 4,881,376 A | * 11/1989 | Yonezawa et al. ............ 62/106 |
| 4,928,495 A | 5/1990 | Siegel |
| 5,335,519 A | 8/1994 | Bernier |
| 5,503,222 A | * 4/1996 | Dunne ................... 165/104.12 |
| 5,661,986 A | 9/1997 | Labranque |
| 5,768,908 A | 6/1998 | Tanaka et al. |
| 6,041,617 A | * 3/2000 | Sanada et al. ................ 62/480 |

FOREIGN PATENT DOCUMENTS

| DE | 94 04 126.1 U1 | 8/1994 |
| DE | 197 30697 A1 | 1/1999 |
| DE | 198 18 807 A1 | 10/1999 |
| FR | 948 292 | 7/1949 |
| FR | 0 029 877 | 6/1953 |
| FR | 2 679 633 A1 | 1/1993 |
| FR | 2 811 412 A1 | 1/2002 |
| WO | WO 99/49964 A1 | 10/1999 |
| WO | WO 00/31206 A1 | 6/2000 |

* cited by examiner

Primary Examiner—Melvin Jones
(74) Attorney, Agent, or Firm—Sughrue Mion, PLLC

(57) ABSTRACT

An adsorption refrigeration device having an evaporator containing a refrigerant liquid that evaporates under the effect of a depression and an adsorbent capable of fixing the vapors (V) of the refrigerant liquid. The adsorbent is in contact with a heat exchanger containing a cooling liquid that evaporates when the adsorbent (205) is heated, and the heat exchanger includes at least one aperture to the outside atmosphere constituted by at least one hole that limits the flow rate of the vapor of the cooling liquid.

17 Claims, 1 Drawing Sheet

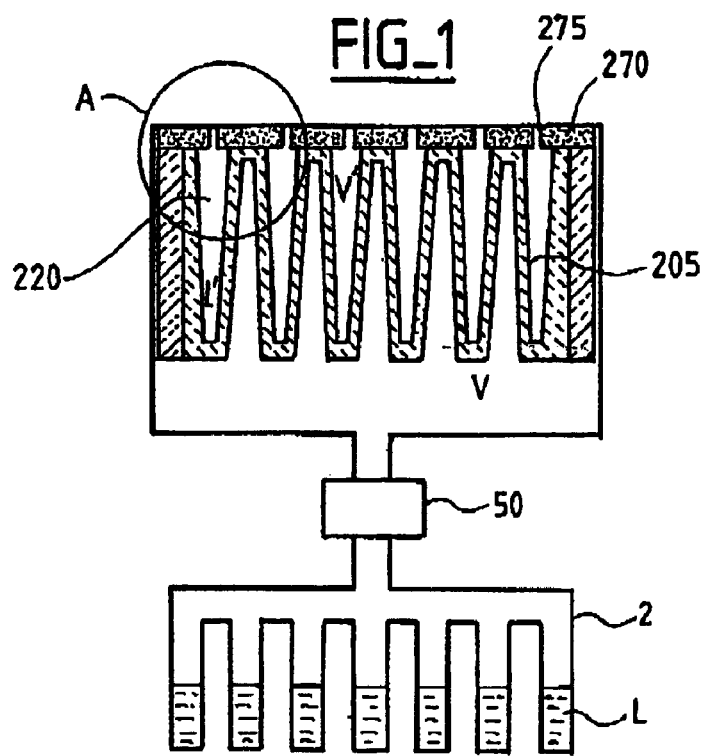
FIG_1
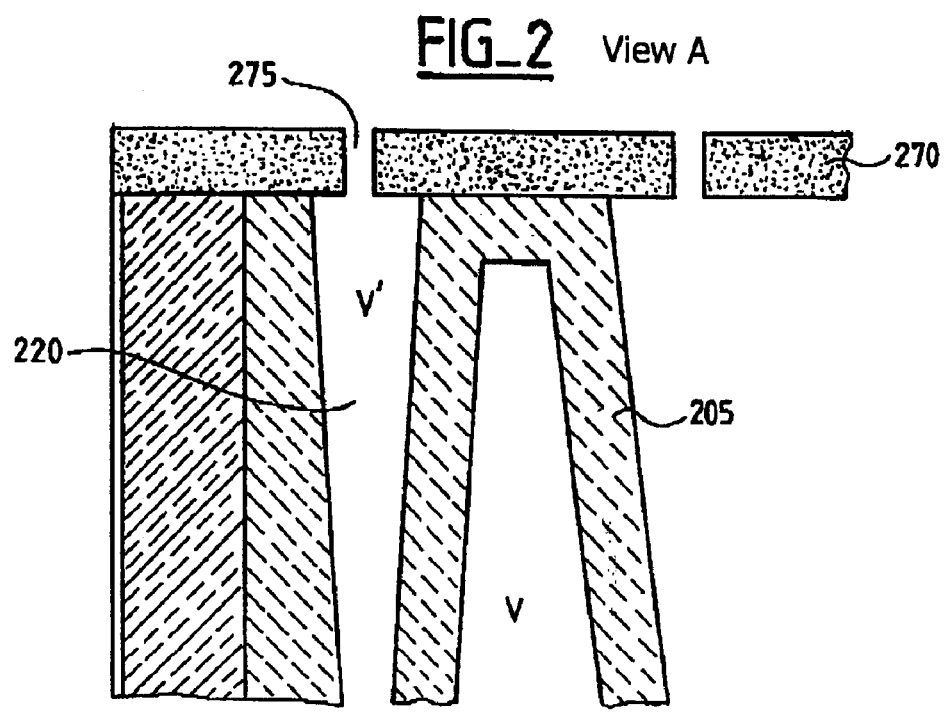
FIG_2  View A

ADSORPTION REFRIGERATING DEVICE

The present invention relates to a device for refrigeration by evaporation and adsorption, whose principle consists in evaporating a liquid under the effect of a depression sustained by adsorption of the vapors of said liquid. It is the evaporation of this refrigerant liquid contained in an evaporator (a chamber, cavity or the like) that prompts a cooling in the vicinity of the evaporator. Another chamber, containing adsorbent material, is generally connected to the evaporator.

The principle of refrigeration by evaporation of a refrigerant liquid and adsorption of vapor of this liquid has undergone numerous developments, both for cyclical systems (with regeneration of adsorbents by heating) and for single-use systems.

In all these devices, the adsorption is accompanied by heat dissipation in the adsorbent leading to a rise in temperature which it is sought to limit by discharging a part of this heat.

The cyclical devices generally comprise adsorbents connected to heat exchangers which firstly discharge of the heat dissipated by the adsorbents during the adsorption reaction of the refrigerating liquid vapors and secondly heat these adsorbents to regenerate them.

In the case of single-use devices, the U.S. Pat. No. 4,759,191 proposes to limit the rise in temperature by the additionn to the adsorbents, of different materials, especially materials having a solid-liquid phase change between 30° C. and 70° C. To obtain a significant effect, it is necessary however to have a large quantity of solid-liquid phase-changing materials (about twice as much as the adsorbents). This U.S. Pat. No. 4,759,191 also mentions the possibility of using a liquid-gas phase-changing material as well as adsorbent temperatures of up to 100° C. or even 110° C. However, the constraints related to the implementation of such a device are not analysed.

The aim of the present invention is to overcome the drawbacks of the prior art.

The most efficient way to limit the rise in the temperature of the adsorbent is to remove the calories by water evaporation, for the latent heat of water is very high (45KJ per mole, namely 18 g of water). However, for fast evaporation, the water should be brought to boiling point. This entails a potential risk of scalding injuries.

To avert this risk, the present invention proposes to associate means with the adsorbent to bring down the temperature of the released vapor.

According to the invention, a heat exchanger containing a cooling liquid (preferably liquid water) is placed in thermal contact with the adsorbent. This heat exchanger has at least one aperture to the outside atmosphere constituted by one or more small holes that limit the flow rate of the water vapor that might escape. This hole or these holes furthermore give rise to an adiabatic expansion or pressure reduction of the pressurized water vapor so as to reduce its temperature when it escapes outwards.

The invention relates more particularly to an adsorption refrigeration device comprising an evaporator containing a refrigerant liquid that evaporates under the effect of a depression and an adsorbent capable of fixing the vapors of the refrigerant liquid, characterized in that the adsorbent is in contact with a heat exchanger containing a cooling liquid which evaporates during the heating of the adsorbent, said heat exchanger containing at least one aperture to the outside atmosphere constituted by at least one hole that limits the rate of flow of the vapor of the cooling liquid According to one characteristic, the cooling liquid undergoes adiabatic expansion through said hole or holes so that its temperature is lowered when it escapes outwards.

According to one characteristic, the lowering of the temperature of the vapor is greater than or equal to 35° C.

According to a preferred embodiment, the cooling liquid comprises water.

According to another characteristic, the adsorbent is a zeolith.

According to one embodiment, the refrigerant liquid is water.

According to another embodiment, the refrigerant liquid is an alcohol.

According to one embodiment, the cooling liquid comprises an aromatic additive releasing a sensation of freshness.

The particular features and advantages of the invention shall appear more clearly from the following description, given by way of an illustrative and non-exhaustive example, made with reference to the appended drawings, of which:

FIG. 1 is a drawing of the device according to the invention in a single-use application;

FIG. 2 is a diagrammatic view in longitudinal section of a portion A of the device according to the invention shown in FIG. 1.

The device according to the invention is designed to be associated at least with one evaporator containing a refrigerant liquid L capable of evaporating under the effect of a depression. The vapors V of this liquid L are adsorbed by an adsorbent 205. This association is described with reference to FIG. 1.

A block of adsorbents 205 is connected to an evaporator 2 constituted by an airtight cavity containing a refrigerant liquid L. A communicating device 50, consisting of a delidding means or a valve for example, is used to activate and then maintain the adsorption of the vapors V of the refrigerant liquid L.

The refrigerant liquid L is preferably water but it may also be an alcohol (such as methanol or ethanol).

The adsorbent 205 is preferably a zeolite. For example, it is a zeolite 13x or zeolite 4A made up of fine powder (with a grain size of some microns to some tens of microns) mixed with a binder (a clay, for example kaolinite), and water to give a thick paste. This paste is then shaped, dried and cooked under vacuum at about 350° to eliminate all the water bound in the zeolite. The adsorbent is then kept in an vacuum-tight state.

The adsorption of the vapors V of the refrigerant liquid L prompts the heating of the adsorbent 205, thus limiting its efficiency. The most efficient way to discharge the calories released by the adsorbent 205 is by water evaporation. However, for fast evaporation, the water must be carried to boiling point. This raises a potential risk of scalding.

The present invention proposes means to bring about a lowering of the temperature of the released vapor.

According to the invention, a heat exchanger 220 containing a cooling liquid L' is placed in thermal contact with the adsorbent 205. This heat exchanger 220 has at least one aperture 275 into the outer atmosphere constituted by one or more small holes that limit the flow rate of the vapor V' that can escape. This hole or these holes furthermore prompt an adiabatic pressure reduction of the vapor V' under pressure so as to lower the temperature when it escapes outwards.

According to one possible embodiment, the assembly constituted by the adsorbent 205 and the heat exchanger 220 is closed by a lid 270 (made of metal such as aluminium for example). This lid 270 may have one or more holes 275 whose diameter is limited in order to provide for an adiabatic pressure reduction of the vapor V' of the cooling liquid L'.

According to a preferred embodiment, the cooling liquid L' comprises water.

According to one mode of implementation, it is possible to provide for an additive to the cooling liquid L' which adds an artificial aroma to the heated vapors V' released outwards. This artificial freshness, based on eucalyptus or watermelon for example, advantageously produces a sensation of freshness.

During the operation of the device, the heat released by the adsorbent 205 prompts the evaporation of the cooling liquid L' and an increase in the pressure of vapor V' inside the heat exchange 220. When the pressurized vapor V' escapes through the small-diameter hole or holes 275, it undergoes adiabatic expansion or pressure reduction which lowers its temperature.

The extent of the drop in temperature of the vapor V' escaping outwards is all the greater as the flow rate of vapor V' is high. This is because, in this case, the pressure in the exchanger 220 is high and the pressure reduction is great.

The table of numerical values here below illustrates the lowering of the temperature of the vapor V' discharged into the outside atmosphere during the working of the device.

Thus, for example, for an overpressure of one bar, the temperature of the vapor V' in the exchanger 220 rises to 120° C. but, after pressure reduction through the hole or holes 275, the temperature of the discharged vapor is no more than about 55° C.

This overpressure may be achieved, for example, by a flow rate of vapor V' of 0.1 g/sec through a hole with a section of 0.4 mm².

The cooling by adiabatic expansion or pressure reduction is governed by the following physical law:

$$\frac{T_2}{T_1} = \left(\frac{P_2}{P_1}\right)^{\frac{\gamma-1}{\gamma}}$$

where the pairs $(T_1, P_1)$ and $(T_2, P_2)$ are the temperatures and pressures before and after pressure reduction.

And where $\gamma$ is the isentropic constant, $\gamma = 1.35$ for H2O at 100° C., $(\gamma-1)/\gamma = 0.259$

| Temperature in the exchanger (° C.) $T_1$ | Pressure $P_1$ in the exchanger (bar) | Temperature after expansion (° C.) $T_2$ |
| --- | --- | --- |
| 100 | 1 | 100 |
| 105 | 1.2 | 87 |
| 110 | 1.4 | 78 |
| 115 | 1.7 | 65 |
| 120 | 2 | 55 |
| 125 | 2.3 | 48 |

The following table illustrates the cooling capacity obtained as a function of the overpressure caused.

The vapor pressure as a function of the temperature is taken from the Handbook of Chemistry and Physics, 80th edition.

The flow rates of the table correspond to a hole with a diameter of 1 mm (0.8 mm2) (Flowmaster code). The flow rate of vapor V' is proportional to the surface area of the hole, and the cooling capacity is proportional to the flow rate (latent heat of vaporization of water).

| T (° C.) | P (bar) | Flow rate g/sec | P (Watt) |
| --- | --- | --- | --- |
| 200 | 15.53 | 1.62 | 4005 |
| 190 | 12.54 | 1.33 | 3325 |
| 180 | 10 | 1.05 | 2625 |
| 170 | 7.91 | 0.81 | 2025 |
| 160 | 6.17 | 0.63 | 1575 |
| 150 | 4.75 | 0.48 | 1200 |
| 140 | 3.61 | 0.36 | 900 |
| 130 | 2.70 | 0.27 | 675 |
| 120 | 1.98 | 0.20 | 500 |
| 115 | 1.69 | 0.17 | 425 |
| 112 | 1.53 | 0.15 | 375 |
| 110 | 1.43 | 0.134 | 335 |
| 108 | 1.33 | 0.12 | 300 |
| 106 | 1.24 | 0.10 | 250 |
| 104 | 1.16 | 0.082 | 205 |
| 102 | 1.08 | 0.060 | 150 |
| 100 | 1 | | |

What is claimed is:

1. An adsorption refrigeration device comprising:
   an evaporator containing a refrigerant liquid that evaporates under the effect of a depression;
   an adsorbent capable of fixing the vapors of the refrigerant liquid;
   a heat exchanger in contact with said adsorbent and containing a cooling liquid that evaporates when the adsorbent is heated; and
   at least one aperture to the outside atmosphere provided in said heat exchanger and comprising at least one hole that limits the flow rate of the vapor of the cooling liquid.

2. A device according to claim 1, wherein the vapor of the cooling liquid undergoes adiabatic pressure reduction through said at least one hole so as to lower the temperature when it escapes outwards.

3. A device according to claim 2, wherein the lowering of the temperature of the vapor is greater than or equal to 35° C.

4. A device according to claim 1, wherein the cooling liquid comprises water.

5. A device according to claim 1, wherein the adsorbent is a zeolite.

6. A device according to claim 1, wherein the refrigerant liquid is water.

7. A device according to claim 1, wherein the refrigerant liquid is an alcohol.

8. A cooling device claim 1, wherein the cooling liquid comprises an aromatic additive.

9. An adsorption refrigeration device comprising:
   an evaporator containing a refrigerant liquid that evaporates under the effect of a depression;
   an adsorbent capable of fixing the vapors of the refrigerant liquid;
   a communicating device that allows the vapors of the refrigerant liquid to reach the adsorbent;
   a heat exchanger in contact with said adsorbent and containing a cooling liquid that evaporates when the adsorbent is heated; and
   at least one aperture to the outside atmosphere provided in said heat exchanger and comprising at least one hole that limits the flow rate of the vapor of the cooling liquid.

10. A device according to claim 9, wherein the vapor of the cooling liquid undergoes adiabatic pressure reduction through said at least one hole so as to lower the temperature when it escapes outwards.

11. A device according to claim 10, wherein the lowering of the temperature of the vapor is greater than or equal to 350°C.

12. A device according to claim 9, wherein the cooling liquid comprises water.

13. A device according to claim 9, wherein the adsorbent is a zeolite.

14. A device according to claim 9, wherein the refrigerant liquid is water.

15. A device according to claim 9, wherein the refrigerant liquid is an alcohol.

16. A device according to claim 9, wherein the refrigerant liquid is an alcohol.

17. A cooling device claim 9, wherein the communicating device is a valve.

* * * * *